No. 642,701. Patented Feb. 6, 1900.
D. E. LLEWELLYN.
NUT LOCK.
(Application filed June 16, 1899.)
(No Model.)
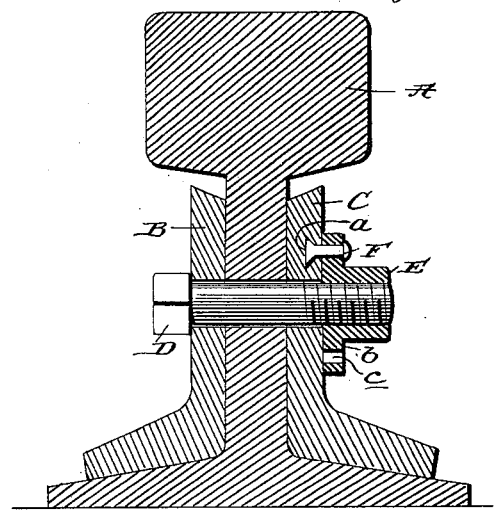
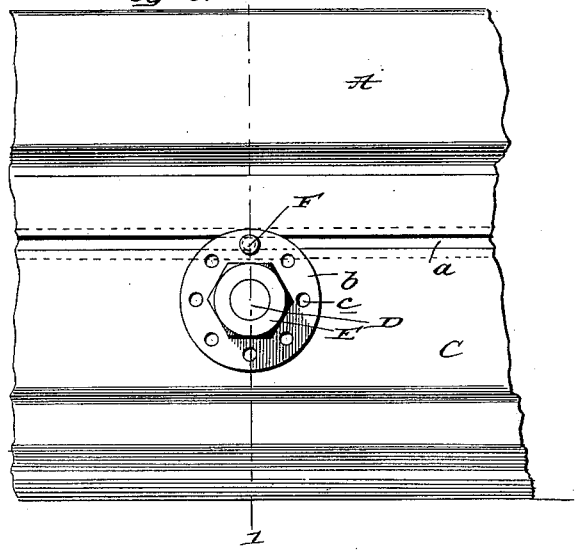
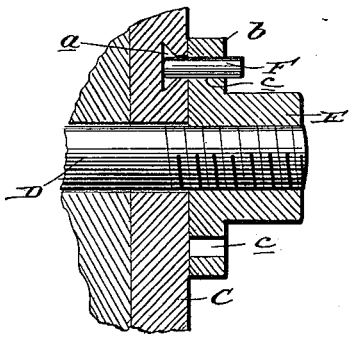
Witnesses:
C. H. Raeder
J. G. Croney
Inventor
David E. Llewellyn.
By James J. Sheehy
Attorney

UNITED STATES PATENT OFFICE.

DAVID E. LLEWELLYN, OF BECKLEY, WEST VIRGINIA.

NUT-LOCK.

SPECIFICATION forming part of Letters Patent No. 642,701, dated February 6, 1900.

Application filed June 16, 1899. Serial No. 720,833. (No model.)

*To all whom it may concern:*

Be it known that I, DAVID E. LLEWELLYN, a citizen of the United States, residing at Beckley, in the county of Raleigh and State of West Virginia, have invented new and useful Improvements in Nut-Locks, of which the following is a specification.

My invention relates to nut-locks; and it consists in the peculiar and advantageous construction hereinafter described, and particularly pointed out in the claims appended.

In the accompanying drawings, Figure 1 is a transverse section illustrating a rail and angle-plates at opposite sides of the same, together with a nut locked on a connecting-bolt in accordance with my invention, the said section being taken in the plane indicated by the broken line 1 1 of Fig. 2. Fig. 2 is a detail side elevation taken at right angles to Fig. 1. Fig. 3 is an enlarged detail section illustrating the locking-rivet prior to its being secured in one of the angle-plates.

Referring by letter to the said drawings, A is an ordinary railway-rail, and B C are angle-plates disposed at opposite sides of the web of the same. The angle-plates B C are also of the ordinary construction, with the exception that the latter is provided in its outer face with a groove $a$ of dovetail form in cross-section, the said groove being by preference arranged parallel to the head of the rail and extended throughout the length of the angle-plate for reasons which will presently appear.

D is an ordinary headed and screw-threaded bolt which is passed through registered apertures in the web of the rail and the vertically-disposed portions of the angle-plates.

E is a nut mounted on the threaded end of said bolt and equipped at its inner end with a peripheral flange $b$, in which is formed a circular series of transverse apertures $c$, and F is a rivet of soft steel or other metal suitable to the purpose, which is calculated to be passed through one of the apertures $c$ and into the groove $a$ and be upset in the latter, as shown in Fig. 1, to secure it in position and enable it to effectually lock the nut against casual turning.

In applying my improvements the bolt D is passed through the registered apertures of the angle-plates and rail-web, and the nut is turned up on the threaded portion of the bolt to the position desired, so that one of its apertures $c$ is coincident with the outer contracted portion of the groove $a$ in plate C. With this done the rivet F is inserted after the manner shown in Fig. 3, and its outer end is hammered so as to upset its inner end in the groove $a$, as illustrated in Fig. 1. Such upsetting or enlarging of the inner end of the rivet renders said end larger than the contracted outer portion of the groove $a$, and hence said rivet is securely held against casual displacement and is enabled to effectually lock the nut on the bolt.

When it is desired to unlock the nut and render it free on the bolt, the same may be accomplished by turning the nut through the medium of a long-handled wrench, and thereby shearing the rivet of soft steel or other metal. When the rivet is thus sheared, the nut may be removed without delay after the ordinary manner.

It will be appreciated from the foregoing that my improved nut-lock is simple and inexpensive, is susceptible of ready application, and is calculated to effectually prevent casual displacement of the nut, all of which are desirable features in a nut-lock.

By reason of the groove $a$ being parallel to the head of the rail and the lines of contraction and expansion provision is made for the linear displacement due to the action of the elements, which is an important advantage.

I prefer to use the groove $a$ for the reasons stated, but would have it understood that I do not care to be understood as limiting myself to the same, as when desirable any other depression having a contracted outer portion may be employed. I also do not desire to be understood as confining myself to the use of the lock in conjunction with a rail and angle-plates, as it may be used to advantage in conjunction with two or more other elements connected by the bolt.

Having thus described my invention, what I claim is—

1. In a nut-lock, the combination of two or more elements to be connected, one of which is provided in its face with a depression having a contracted outer portion, a threaded bolt extending through apertures in the elements, a nut mounted on the bolt and having an aperture coincident with the contracted outer portion of the depression in the element, and a rivet passed through the aperture of the nut and into the depression of the element and having its inner end upset or enlarged in the latter, substantially as specified.

2. In a nut-lock, the combination of a railway-rail, angle-plates disposed at opposite sides of the web of the same; one of said plates having a longitudinal groove of dovetail form in cross-section in its outer side, a threaded bolt passed through registered apertures of the rail and plates, a nut mounted on said bolt and having a peripheral flange provided with a plurality of transverse apertures adapted to register with the groove of the angle-plate, and a rivet passed through one of the apertures of the nut and into the groove of the angle-plate and having its inner end upset and enlarged in the latter, substantially as specified.

3. In a nut-lock, the combination of two or more elements to be connected, one of which is provided in its face with a longitudinal groove of dovetail form in cross-section, a threaded bolt extending through apertures in the elements, a nut mounted on the bolt and having an aperture coincident with the outer contracted portion of the groove in the element, and a rivet passed through the aperture of the nut and into the groove in the element and having its inner end upset or enlarged in the latter, substantially as specified.

In testimony whereof I have hereunto set my hand in presence of two subscribing witnesses.

DAVID E. LLEWELLYN.

Witnesses:
LUCIEN H. DAVIS,
ISADORE W. MEADOWS.